United States Patent
D'Oyly-Watkins (10) Patent No.: US 12,123,785 B2
(45) Date of Patent: Oct. 22, 2024

(54) SYSTEM AND METHOD TO DETERMINE TEMPERATURE COMPENSATED PRESSURE OF A PRESSURE TRANSDUCER

(71) Applicant: BAE SYSTEMS plc, London (GB)

(72) Inventor: David Christopher D'Oyly-Watkins, Rochester (GB)

(73) Assignee: BAE SYSTEMS plc, London (GB)

( * ) Notice: Subject to any disclaimer, the term of this patent is extended or adjusted under 35 U.S.C. 154(b) by 282 days.

(21) Appl. No.: 17/593,582

(22) PCT Filed: Mar. 10, 2020

(86) PCT No.: PCT/GB2020/050569
§ 371 (c)(1),
(2) Date: Sep. 21, 2021

(87) PCT Pub. No.: WO2020/201691
PCT Pub. Date: Oct. 8, 2020

(65) Prior Publication Data
US 2022/0170798 A1   Jun. 2, 2022

(30) Foreign Application Priority Data

Mar. 29, 2019 (EP) ..................................... 19275034
Mar. 29, 2019 (GB) ..................................... 1904379

(51) Int. Cl.
*G01K 11/22* (2006.01)
*G01L 9/00* (2006.01)
(Continued)

(52) U.S. Cl.
CPC ............ *G01K 11/22* (2013.01); *G01L 9/0016* (2013.01); *G01L 11/04* (2013.01); *G01L 19/04* (2013.01); *G01N 2291/02872* (2013.01)

(58) Field of Classification Search
CPC ..... G01L 19/0007; G01L 9/0072; G01L 7/00; G01L 19/0645; G01L 7/04; G01L 19/147;
(Continued)

(56) References Cited

U.S. PATENT DOCUMENTS 11,680,842 B2 * 6/2023 Kuhnen .................. G01N 9/00
73/290 V
11,714,015 B1 * 8/2023 Berg ....................... G01L 9/045
73/708

(Continued)

FOREIGN PATENT DOCUMENTS

CN    104535251 B  *  2/2017
GB       827344 A       2/1960
(Continued)

OTHER PUBLICATIONS

International Search Report and Written Opinion received for PCT Application No. PCT/GB2020/050569. Mail date: Jun. 17, 2020. 12 pages.
(Continued)

*Primary Examiner* — Andre J Allen
(74) *Attorney, Agent, or Firm* — Finch & Maloney PLLC (57) ABSTRACT

A system to determine a temperature corrected pressure of a medium in a pressure transducer is disclosed. The system comprises a first circuitry to obtain a first value related to a vibration frequency of the vibration of a pressure sensitive vibration member; a second circuity to obtain a second value related to a vibration amplitude of the vibration of the vibration member; and a third circuity to use the first value and the second value to determine the temperature corrected pressure of the medium based on a predetermined relationship between the vibration frequency and the vibration amplitude.

20 Claims, 4 Drawing Sheets

(51) Int. Cl.
G01L 11/04 (2006.01)
G01L 19/04 (2006.01)

(58) Field of Classification Search
CPC . G01L 13/025; G01L 19/0084; G01L 9/0042; G01L 9/0073; G01L 7/18; G01L 9/0075; G01L 19/0038; G01L 17/00; G01L 19/04; G01L 9/0054; G01L 9/0055; G01L 7/041; G01L 19/148; G01L 7/16; G01L 19/14; G01L 15/00; G01L 19/0092; G01L 19/143; G01L 7/084; G01L 9/0051; G01L 13/02; G01L 9/12; G01L 19/0609; G01L 19/0618; G01L 9/0052; G01L 9/065; G01L 19/08; G01L 9/007; G01L 9/125; G01L 19/0046; G01L 19/003; G01L 19/0627; G01L 19/0636; G01L 7/043; G01L 9/0002; G01L 9/06; G01L 19/0023; G01L 7/063; G01L 9/0022; G01L 19/02; G01L 9/006; G01L 23/18; G01L 9/008; G01L 19/142; G01L 19/0672; G01L 19/141; G01L 7/082; G01L 7/22; G01L 19/12; G01L 19/0681; G01L 27/005; G01L 23/10; G01L 9/0026; G01L 11/02; G01L 9/0077; G01L 21/12; G01L 19/0069; G01L 19/0015; G01L 9/0044; G01L 9/0035; G01L 11/00; G01L 11/008; G01L 21/00; G01L 19/146; G01L 27/002; G01L 27/007; G01L 9/0001; G01L 9/0089; G01L 19/0654; G01L 19/00; G01L 9/16; G01L 11/004; G01L 11/006; G01L 9/045; G01L 11/025; G01L 13/026; G01L 9/0047; G01L 9/14; G01L 9/0061; G01L 9/0025; G01L 9/10; G01L 13/00; G01L 13/023; G01L 9/0057; G01L 9/0005; G01L 27/00; G01L 9/0041; G01L 9/0076; G01L 7/08; G01L 9/08; G01L 19/0061; G01L 19/086; G01L 9/0019; G01L 9/0091; G01L 23/125; G01L 21/04; G01L 9/0008; G01L 9/0027; G01L 19/069; G01L 19/10; G01L 9/0016; G01L 19/083; G01L 7/24; G01L 9/04; G01L 1/18; G01L 9/0036; G01L 1/2281; G01L 19/06; G01L 7/048; G01L 7/182; G01L 9/0048; G01L 19/16; G01L 1/02; G01L 11/04; G01L 9/00; G01L 9/0013; G01L 9/0079; G01L 9/0086; G01L 9/0083; G01L 9/0092; G01L 11/002; G01L 7/166; G01L 1/20; G01L 1/2212; G01L 7/104; G01L 19/0663; G01L 23/22; G01L 23/24; G01L 9/0029; G01L 7/088; G01L 9/0039; G01L 9/0098; G01L 23/02; G01L 5/14; G01L 19/145; G01L 9/0033; G01L 9/02; G01L 9/0045; G01L 1/142; G01L 7/022; G01L 9/0085; G01L 1/2293; G01L 21/14; G01L 21/22; G01L 9/0064; G01L 13/06; G01L 9/0007; G01L 1/205; G01L 23/08; G01L 7/061; G01L 13/028; G01L 23/16; G01L 7/02; G01L 7/163; G01L 9/0095; G01L 1/148; G01L 1/16; G01L 23/28; G01L 7/024; G01L 7/12; G01L 9/0004; G01L 1/2287; G01L 23/222; G01L 9/003; G01L 9/025; G01L 1/14; G01L 1/2231; G01L 9/0058; G01L 9/085; G01L 9/105; G01L 27/02; G01L 7/086; G01L 1/2206; G01L 19/0076; G01L 7/06; G01L 9/002; G01L 9/0032; G01L 9/0082; G01L 19/149; G01L 21/10; G01L 23/00; G01L 7/068; G01L 9/0038; G01L 9/0094; G01L 1/162; G01L 1/246; G01L 23/32; G01L 13/021; G01L 5/228; G01L 7/14; G01L 1/005; G01L 1/125; G01L 1/2262; G01L 1/24; G01L 1/26; G01L 23/26; G01L 7/20; G01L 5/18; G01L 7/102; G01L 7/187; G01L 11/06; G01L 19/144; G01L 7/108; G01L 1/086; G01L 1/146; G01L 1/2218; G01L 1/225; G01L 21/34; G01L 7/045; G01L 9/0097; G01L 9/18; G01L 1/127; G01L 1/2268; G01L 13/04; G01L 23/12; G01L 23/221; G01L 1/144; G01L 1/165; G01L 17/005; G01L 5/0076; G01L 1/22; G01L 21/30; G01L 1/10; G01L 1/241; G01L 21/32; G01L 1/245; G01L 23/145; G01L 3/245; G01L 9/001; G01L 9/0088; G01L 1/106; G01L 1/183; G01L 23/223; G01L 5/0047; G01L 9/0023; G01L 1/04; G01L 1/044; G01L 1/08; G01L 1/243; G01L 21/26; G01L 3/1485; G01L 5/165; G01L 5/225; G01L 5/226; G01L 9/0017; G01L 9/005; G01L 1/00; G01L 1/186; G01L 21/02; G01L 21/16; G01L 25/00; G01L 5/0004; G01L 5/0038; G01L 5/0052; G01L 7/028; G01L 7/065; G01L 7/10; G01L 1/083; G01L 1/2275; G01L 21/24; G01L 23/225; G01L 3/10; G01L 3/102; G01L 3/105; G01L 5/162; G01L 7/026; G01L 9/0014; G01L 1/103; G01L 1/12; G01L 21/36; G01L 23/04; G01L 3/103; G01L 5/0028; G01L 5/0033; G01L 5/133; G01L 5/22; G01L 5/223; G01L 5/24; G01L 5/243; G01L 7/185; G01L 9/0011; G01L 1/122; G01L 1/2243; G01L 1/242; G01L 1/247; G01L 1/255; G01L 2009/0069; G01L 21/06; G01L 21/08; G01L 23/06; G01L 23/14; G01L 23/30; G01L 3/00; G01L 3/06; G01L 3/1478; G01L 3/1492; G01L 3/24; G01L 3/242; G01L 5/00; G01L 5/0057; G01L 5/08; G01L 5/101; G01L 5/102; G01L 5/1627; G01L 5/166; G01L 1/042; G01L 1/046; G01L 1/2225; G01L 1/2256; G01L 1/248; G01L 2009/0066; G01L 2009/0067; G01L 2019/0053; G01L 23/085; G01L 3/18; G01L 5/0061; G01L 5/10; G01L 5/108; G01L 5/167; G01L 5/171; G01L 5/28; G01K 11/22; G01N 2291/02872

USPC .................................................. 73/700–756
See application file for complete search history.

(56) References Cited

U.S. PATENT DOCUMENTS

2004/0211260 A1* 10/2004 Girmonsky ........... G01L 9/0008
  702/56
2010/0006089 A1    1/2010 Hocker et al.

(56) References Cited

U.S. PATENT DOCUMENTS

2010/0030486 A1 2/2010 Lopatin et al.
2015/0308911 A1* 10/2015 Pechstedt ................ G01L 19/04
73/579

FOREIGN PATENT DOCUMENTS

GB 1428903 A 3/1976
WO 2020201691 A1 10/2020

OTHER PUBLICATIONS

GB Search Report under Section 17(5) received for GB Application No. GB1904379.3, dated Jul. 19, 2019. 3 pages.
GB Search Report under Section 17 received for GB Application No. GB2003448.4, dated May 27, 2020. 4 pages.
Extended European Search Report received for EP Application No. 19275034.7, dated Oct. 7, 2019. 7 pages.
International Preliminary Report on Patentability received for PCT Application No. PCT/GB2020/050569. Date of Issue: Sep. 28, 2021. 8 pages.

* cited by examiner

SYSTEM AND METHOD TO DETERMINE TEMPERATURE COMPENSATED PRESSURE OF A PRESSURE TRANSDUCER

BACKGROUND

Pressure transducers, sometimes known as pressure transmitters, are a type of sensor that converts the pressure of a medium into an electric signal, which allows a pressure of the medium to be measured. A specific type of high accuracy pressure transducer is a pressure transducer based on the vibrating cylinder technology. A pressure transducer based on the vibrating cylinder technology may comprise an internal ferromagnetic cylindrical vibrating member and an exterior cladding, such that the vibrating member is inside a cavity. To minimise sensitivity to changes in temperature the transducer may be fabricated from an alloy of mainly iron and nickel the exact composition and fabrication of which is optimised to give a low temperature coefficient. The volume between the vibrating member and the external cladding is evacuated to produce a reference vacuum.

The medium to be measured (typically a gas such as air) is applied to the inside of the vibrating member, which stresses the member and hence affects its resonant frequency. This effect is primarily dependent on the magnitude of the applied pressure with respect to the reference vacuum. The resonant frequency of the vibrating member increases as the applied pressure increases. To induce the resonance in the vibrating member energy is introduced, typically using drive electromagnets mounted in the outer cylinder but physically close to the vibrating member. Additional electromagnet coils may be used to sense the motion of the vibrating member that are used in conjunction with an amplifier circuit to apply a positive feedback signal to the drive electromagnets that induce and maintain oscillation of the vibrating member. Typically, the vibrating member can exhibit many modes of oscillation at differing frequencies so the amplifier circuit normally includes frequency selective elements that ensure that the positive feedback is only applied at the primary resonant mode of the vibrating member.

The amplifier circuit also includes a suitably conditioned output of the signal from the transducer's pickup electromagnet that is fed into an external circuit that measures its instantaneous frequency and converts this into an equivalent value of pressure using further processing.

Although the resonant frequency of the vibrating member is primarily affected by the applied pressure other secondary factors can also affect the transducer's characteristic. The most significant of these is the ambient operating temperature. To obtain a measurement of the pressure with high accuracy it is therefore appropriate to include a means of recording the sensor's temperature and calculate the pressure based on the temperature information and the oscillation frequency. This may be performed by combining the oscillation frequency and temperature information using a two dimensional surface fit polynomial equation in a single operation to directly generate a pre-compensated value for the applied pressure.

DETAILED DESCRIPTION

Pressure transducers of the vibrating member type have proven to be particularly stable and rugged and therefore may be used in demanding environments, for example on aircraft. If the pressure transducers are located on aircraft it may be desirable that they function with a high accuracy over a wide range of dynamically changing temperatures and pressures.

As the operating temperature of the pressure transducer may have an effect on its measurement, a means of compensation of the pressure transducer output may be desirable. In the current generation of vibrating cylinder pressure transducers a measurement of temperature information is typically performed by a separate sensing device, for example a forward biased silicon diode. This sensing device may be mounted in the metallic outer cladding of the pressure transducer some distance from the vibrating member and near to the mounting base of the device, which typically has a relatively large thermal mass.

In normal use circuitry, which may be external to the pressure transducer, measures the frequency of the vibrating member together with a signal from the temperature sensing device that is proportional to the transducer's temperature. The temperature information and frequency may then be combined using a compensation algorithm to obtain a temperature corrected pressure. The compensation algorithm may be unique to each individual transducer and directly determines a temperature compensated value for the applied pressure. The compensation algorithm may be predetermined for each individual pressure transducer.

Under stable thermal conditions thermal equilibrium will be established throughout the transducer and the correct compensation will be applied. However, as the temperature sensing device is not mounted directly on the vibrating member small errors in the applied compensation, and hence the computed pressure value, may occur during rapid transient temperature changes. Rapid transient temperature changes cause thermal differences between the vibrating member and the temperature sensing device. Therefore, when performing calibrations or when initially determining the compensation algorithm, measurements should be sufficiently spaced out in time to allow for the temperature to reach equilibrium. This spacing may increase the overall time the pressure transducer requires to be calibrated or the compensation algorithm determined, increasing the cost of each pressure transducer.

Figure 1A:
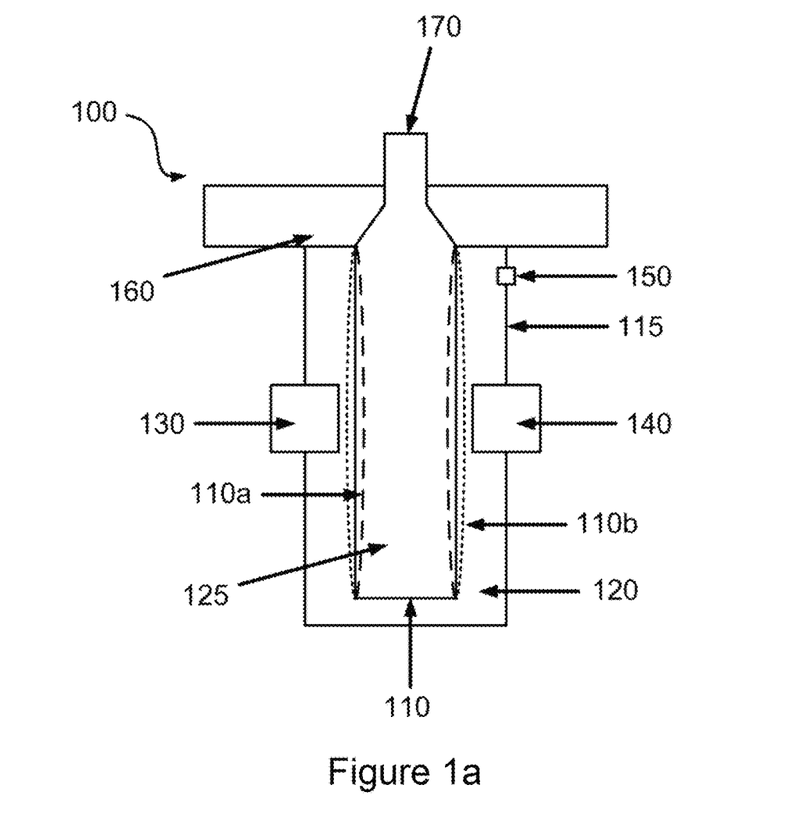
FIG. 1a illustrates a pressure transducer according to some examples.

FIG. 1a illustrates a pressure transducer 100 according to some examples. The pressure transducer 100 comprises a vibrating member 110 inside an evacuated cavity 120 of the pressure transducer 100, the cavity formed by an exterior casing 115. A medium (such as air), the pressure of which is to be determined, may be introduced into the central cavity 125 of the transducer 100 via a port 170. An integral mounting base 160 may be incorporated at one end of the cylinder to facilitate the attachment of the sensor to the structure of the equipment in which the sensor is incorporated. This base may also provide mechanical support for the pneumatic port. An electromagnet 130 may be used to induce a vibration or oscillation of the vibration member 110. Normally, by design, the vibration member 110 has a very sharp resonance characteristic with a high Q factor. A motion sensor 140 may be used to detect movement of the vibration member 110. The pressure transducer may also comprise a temperature measuring system 150 to determine a value related to the temperature of the device 100. The vibration member 110 may comprise a ferromagnetic material.

In use, an electromagnetic field, supplied by electromagnet 130 induces an oscillation or vibration in the vibration member 110 at or substantially close to the fundamental natural vibration frequency of the vibration member 110 or another mode or combination of modes of the vibration member 110, and the vibration member 110 moves to a first position 110a. The vibration member may then oscillate or vibrate to a second position 110b.

In some examples the vibration member 110 is configured to oscillate at its natural frequency, or a desired mode or combination of modes by the use of an amplifying circuit which may maintain the resonance of the vibration member 110 by selectively amplifying only certain modes or ranges of frequencies. Such amplification may be performed by a two part process comprising amplifying the signal and modifying the signal to further control the resonance. In some examples the amplifying circuit may modify the signal by including a windowing circuit or filtering circuit (i.e. a bandpass filter), which windows the signal such that signals within a certain window of frequency (or wavelength) are not substantially attenuated, and outside of the certain window the signal is substantially attenuated or has a phase characteristic that will not result in positive feedback being applied. This may improve the mode selection of the pressure transducer, as undesired modes are attenuated substantially. In addition, the window circuit may condition the signal amplitude to the electromagnet 130 such that it provides a constant drive level over all conditions of temperature and applied pressure.

The precise frequency of oscillation of the resonant member 110 is dependent on the overall gain/phase characteristics of the pressure transducer itself in conjunction with the gain/phase characteristic of the amplifying circuit. This combination will tend to oscillate at the frequency where there the overall phase shift around the loop is zero, which may not be exactly the same as, but due to the vibrating member's high Q, will be very close to its natural resonant peak. A consequence of the oscillation not occurring at the natural frequency is that the amplitude of the signal at the output of the motion sensor 140 can be less than it would be at the true natural resonance. As the phase characteristics of both the vibrating member and the maintaining amplifier vary with the operating frequency, which is pressure dependent, it is usual to see that there is a small pressure dependent change in signal amplitude even when the signal to the sensor's drive electromagnets 130 are conditioned to be at a constant level. The phase response of an optimised amplifier is normally designed to ensure oscillation at the sensor's true natural frequency is close to the mid-point in the pressure range such that the signal amplitude at the motion sensor peaks at that point and decreases gradually as the pressure move towards the operating extremes. In such a system the change in output amplitude has been observed to be in the order of 2 dB across the pressure range. In existing applications this effect is of no consequence to the operation or calibration of the transducer as the amplitude of the signal from the sensor is not measured.

Figure 1B:
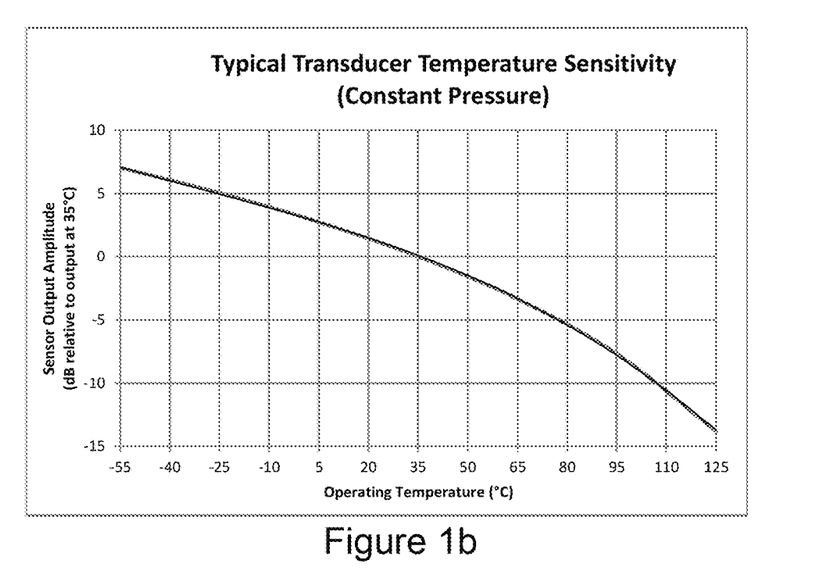
FIG. 1b illustrates a relationship between amplitude of vibration of a vibration member and temperature of the vibration member.

In addition to the effects described above it has been identified in this disclosure that the amplitude of the pressure transducer's 100 motion sensor 140 signal output is strongly proportional to the operational temperature of the pressure transducer 100. An example of a plot of output amplitude versus temperature of a typical pressure transducer with a constant pressure applied at the transducer's port 170 is shown in FIG. 1b. Based on this, the temperature corrected pressure may be calculated using the frequency and amplitude information without needing to use a separate temperature sensing means.

In FIG. 1b a pressure transducer 100 is used where the vibration member 110 comprises a hollow cylinder. In view of the strong relationship noted above between the amplitude of vibration and the operating temperature it is possible to obtain the temperature corrected pressure from the amplitude and the frequency information without needing to directly measure the temperature. The amplitude information should be obtained prior to any operation that would result in the relative amplitude information being lost or discarded, for example should be obtained prior to constraining the amplitude to a certain value.

In some examples the vibration member 110 may comprise a substantially cylindrical member and/or be substantially hollow. In some examples the vibration member 110 may be substantially metallic. In some examples the vibration member may be substantially formed of a ferromagnetic material, such as a metal, or metal alloy.

In some examples the vibration member may be substantially formed of Ni-Span-C Alloy 902, which is a Registered Trade Mark belonging to the Special Metals Corporation. The definition of the materials and processing of Ni-Span-C 902 may be found in Technical Datasheet AWS 080 Rev.1 published by Alloy Wire international, and this document is hereby incorporated by reference.

In some examples the pressure transducer may be a vibrating cylinder pressure transducer similar to the type available from Weston Aerospace part of the Esterline Advanced Sensors platform within Esterline Technologies.

Figure 2:
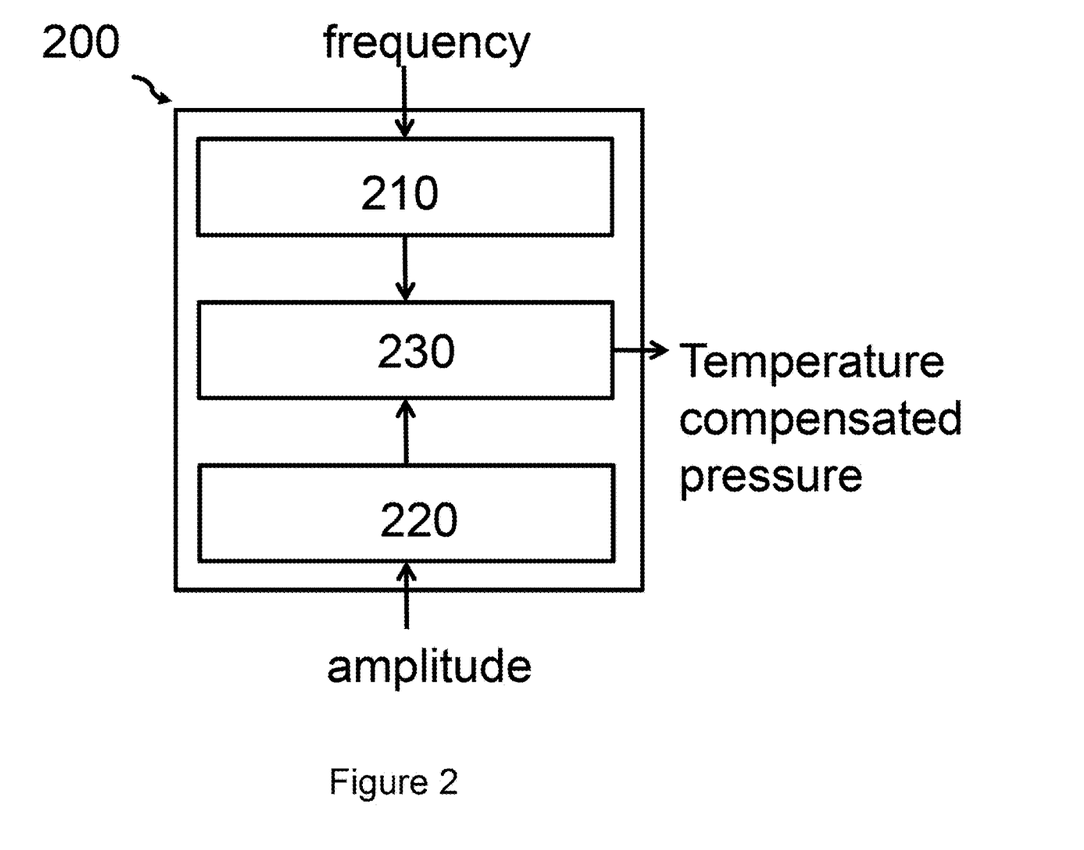
FIG. 2 illustrates a system according to some examples.

FIG. 2 illustrates a temperature compensated pressure measuring system 200. Temperature compensated pressure measuring system 200 comprises a first circuitry 210, a second circuitry 220 and a third circuitry 230. The first circuitry 210 is to obtain a first value related to a vibration frequency of the vibration of the vibration member 110. The second circuity 220 is to obtain a second value related to a vibration amplitude of the vibration of the vibration member 110. The third circuity 230 is to use the first value and the second value to determine a temperature compensated pressure of the medium sensed by the pressure transducer 100. The first value and the second value relate to the vibration frequency and the vibration amplitude by a known relationship.

The temperature compensated pressure measuring system 200 may be external or integrated with the pressure transducer 110. The temperature compensated pressure measuring system 200 being external to the pressure transducer may allow for a less bulky device, and therefore improve the manufacturing and reduce the cost of the device. The temperature compensated pressure measuring system 200 may be integrated with the pressure transducer 100, such as it may be mounted to an external casing. Alternatively, the temperature compensated pressure measuring system 200 may be a separate and discrete device.

The first circuitry 210, second circuitry 220 and the third circuitry 230 may be located in the same place, or located in separate locations.

The temperature corrected pressure is related to the amplitude and frequency of vibration of the vibration member by a polynomial relationship. A calibration may be performed to determine a calculation algorithm, and the calculation algorithm may be used to obtain the temperature corrected pressure of the medium sensed by the pressure transducer 100.

Pressure transducers of the type described in relation to FIGS. 1-2 comprising a temperature compensated pressure measuring system 200 may be calibrated faster than conventional pressure transducers which use a temperature sensor mounted to the pressure transducer, as there is no requirement to wait for the pressure transducer to reach thermal equilibrium. This is due to the realisation that the amplitude is directly related to the instantaneous temperature of the vibrating member 110. Furthermore, such pressure transducers using a temperature compensated pressure measuring system 200 may also perform effectively and accurately on aircraft as the pressure transducer would be able to output a temperature compensated pressure value, rather than an uncompensated pressure value or a value that has been compensated based on a non-instantaneous temperature. Using a non-instantaneous temperature to determine the temperature compensated pressure may result in a measurement that has a lag if the pressure and/or temperature change rapidly.

Figure 3:
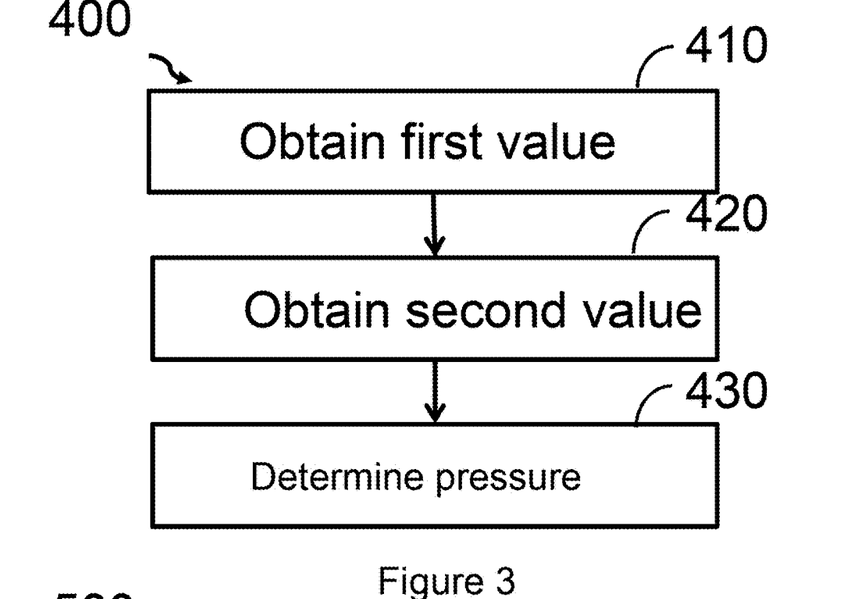
FIG. 3 illustrates a method according to some examples.

FIG. 3 illustrates a method to determine a temperature corrected pressure of the medium sensed by the pressure transducer 400, the pressure transducer comprising a vibration member configured to vibrate under an input of a pressure in accordance with some examples. The pressure transducer may be the same or similar to the pressure transducer as described in relation to FIGS. 1 to 2.

A first value related to the frequency of vibration of the vibration member is obtained 410. A second value related to the vibration amplitude of the vibration of the vibration member is obtained 420. The first value and the second value are used to determine the temperature corrected pressure of the medium sensed by the pressure transducer based on a pre-determined algorithm 430.

In some examples, obtaining the first value may comprise receiving a value corresponding to the vibration frequency from another source, such as a vibration sensor, the first value having been calculated previously. However in some examples, obtaining the first value may comprise receiving the vibration signal and calculating the first value.

In some examples, obtaining the second value may comprise receiving a value corresponding to the vibration amplitude from another source, such as a vibration sensor, the first value having been calculated previously. However in some examples, obtaining the vibration amplitude may comprise receiving the vibration signal and calculating the second value.

In some examples the method 400 may further comprise amplifying at least one of the amplitude of vibration and frequency of vibration by an amplifying circuit. In some examples at least one of the frequency or amplitude may be amplified prior to being calculated or obtained. In some examples after amplifying at least one of the amplitude or the frequency the signal may be capped or a frequency selected. The capping or frequency selection of the signal may assist in maintaining the resonance of the vibration member, as only the resonant frequency will be amplified, and other frequencies unwanted frequencies will be allowed to attenuate. The amplitude of vibration may be determined prior to the capping or filtering, or any process that substantially modifies the magnitude of the vibration of the vibration member by the amplification system. The reason for this is evident from the realisation that the temperature is directly related to the amplitude magnitude. Modifying the amplitude magnitude would also modify the temperature or temperature compensated pressure that is obtained.

Figure 4:
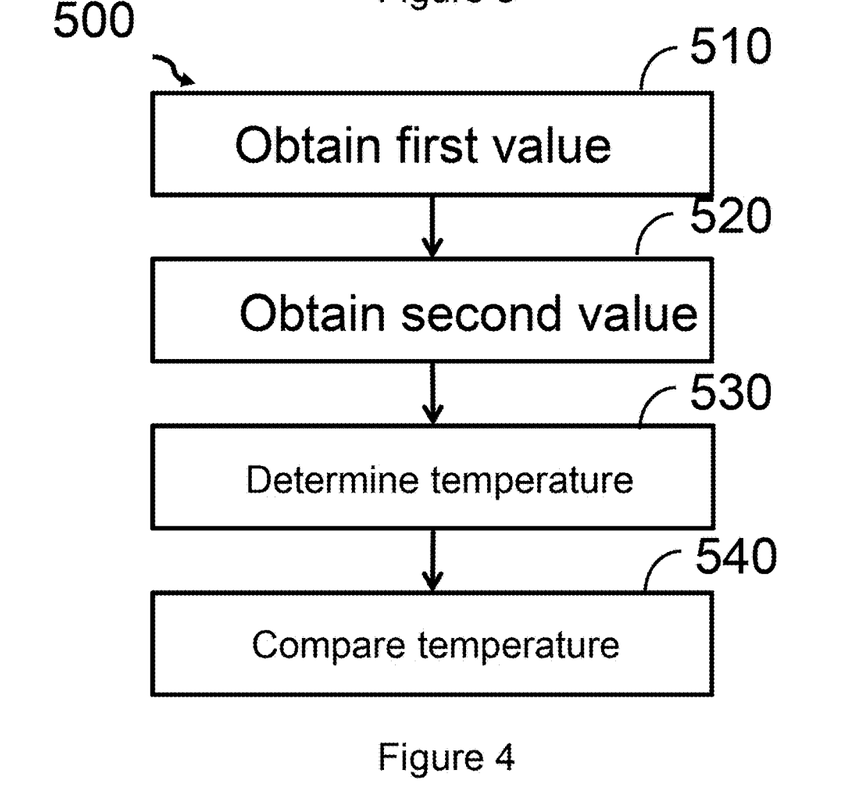
FIG. 4 illustrates a further method according to some examples.

FIG. 4 illustrates a further method to determine temperature information of a vibration member of a pressure transducer 500, the vibration member configured to vibrate under an input of a pressure in accordance with some examples. The method is similar to method 400, however the method 500 further comprises comparing temperature information of the vibration member with comparison temperature information, the comparison temperature information obtained by a different method than the temperature information of the vibration member based on the vibration amplitude, herein referred to as an alternate method. Temperature information may be obtained from the second value, as the second value is related to the temperature of the vibration member.

In some examples the method 500 may not comprise comparing the temperature information 540, such that the method 500 is a method to output an instantaneous temperature of the vibration member of the pressure transducer.

In some examples the alternate method may make use of a diode sensor, such as a forward biased diode. The forward biased sensor may be attached to a part of the pressure transducer. Comparing the temperature information determined from the second value to the comparison temperature information obtained by the alternate method may allow for the temperature information to be verified, improving integrity of the system. In some examples the temperature comparison may be performed at a greater time interval than the temperature determined from the amplitude.

In some examples, the temperature information obtained from the second value and from the alternated method may be combined to produce a single value for temperature, which may improve the accuracy of the temperature value.

It should be noted that certain of the process steps depicted in the flowchart of FIGS. 3 and 4 and described above may be omitted or such process steps may be performed in differing order to that presented above and shown in FIGS. 3 and 4. Furthermore, although all the process steps have, for convenience and ease of understanding, been depicted as discrete temporally-sequential steps, nevertheless some of the process steps may in fact be performed simultaneously or at least overlapping to some extent.

Figure 5:
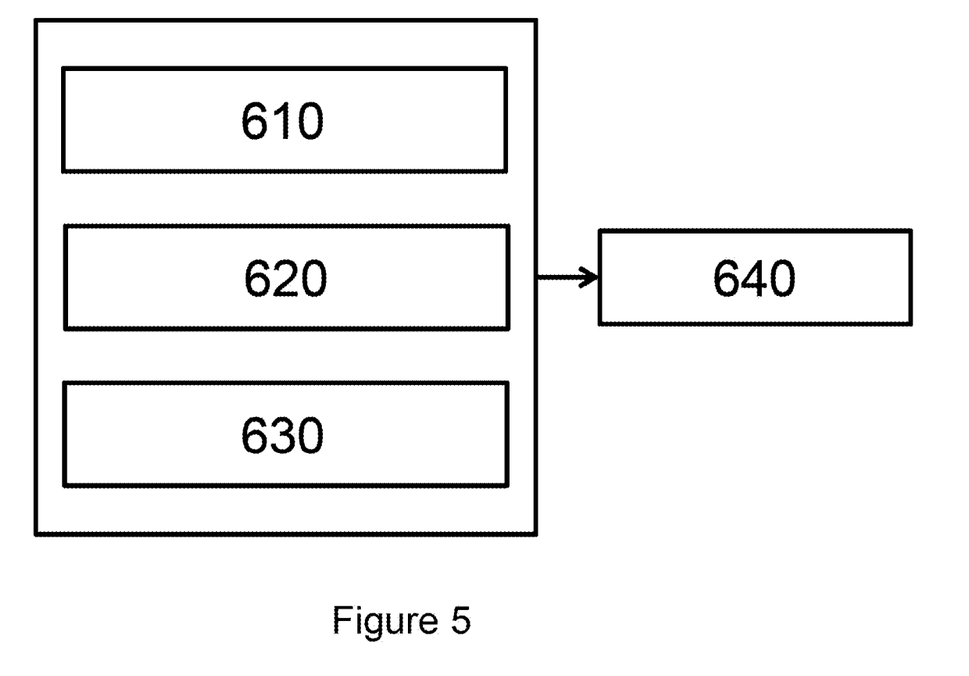
FIG. 5 illustrates a computer readable medium according to some examples.

FIG. 5 illustrates a computer readable medium 600 comprising instructions, the instructions when executed cause a processing means 640 to perform a method to determine temperature corrected pressure of a medium of a pressure transducer 100. In some examples the computer readable medium includes a vibration frequency module 610, a vibration amplitude module 620 and a temperature corrected pressure determination module 630. The computer readable medium may also comprise other modules not illustrated in FIG. 5.

The vibration frequency module 610 contains instructions, when executed, that cause the processing means 640 to obtain a first value related to the vibration frequency of the vibration member. In some examples this may comprise receiving the first value having already been determined from another source, or receiving a signal containing the vibration frequency and determining the first value.

The vibration amplitude module 620 contains instructions, when executed, cause the processing means 640 to obtain a second value related to the vibration amplitude of the vibration member. In some examples this may comprise receiving the second value having already been determined from another source, or receiving a signal containing the vibration amplitude and determining the vibration frequency.

The corrected pressure determination module 630 contains instructions, that when executed, cause processing means 640 to determine the temperature corrected pressure based on the first value and the second value.

The processing means 640 may comprise at least one processor. The processing means may comprise a plurality of processing means located in one location or a plurality of locations.

Although a few preferred embodiments have been shown and described, it will be appreciated by those skilled in the art that various changes and modifications might be made without departing from the scope of the invention, as defined in the appended claims.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A system to determine a temperature corrected pressure of a medium in a pressure transducer, the system comprising:
   a first circuitry to obtain a first value related to a vibration frequency of the vibration of a pressure sensitive vibration member;
   a second circuitry to obtain a second value related to a vibration amplitude of the vibration of the vibration member; and
   a third circuitry to use the first value and the second value to determine the temperature corrected pressure of the medium based on a pre-determined relationship between the vibration frequency and the vibration amplitude.

2. The system according to claim 1, wherein the vibration member is formed of at least one metal and/or at least one metal alloy.

3. The system according to claim 2, wherein the at least one metal and/or metal alloy comprises an alloy comprising at least one of Ni, Fe, Cr, Al and Ti.

4. The system according to claim 1, wherein at least one of the vibration amplitude and vibration frequency is amplified by an amplifying circuit.

5. The system according to claim 4, wherein the system is configured to obtain the vibration amplitude prior to a capping and/or filtering operation by the amplifying circuit.

6. The system according to claim 1, wherein the vibration member is hollow and/or cylindrical.

7. A pressure transducer comprising:
   an exterior casing having a cavity formed therein; and
   the system according to claim 1; wherein, the vibration member is disposed within the cavity, and wherein the system is configured to determine the temperature corrected pressure of the medium introduced into the cavity.

8. An aircraft comprising the pressure transducer according to claim 7, wherein the system further comprises an amplifying circuit configured to maintain resonance of the vibration member.

9. A method to determine a temperature corrected pressure of a medium in a pressure transducer, the method comprising:
   obtaining a first value related to a vibration frequency of the vibration of a vibration member, the vibration member configured to vibrate under an input of a pressure;
   obtaining a second value related to a vibration amplitude of the vibration of the vibration member; and
   using the first value and the second value to determine the temperature corrected pressure of the medium based on a predetermined relationship between the vibration frequency and the vibration amplitude.

10. The method according to claim 9, comprising calculating a temperature value of the vibration member based on the second value, wherein the temperature value is related to the temperature of the vibration member.

11. The method according to claim 10, comprising comparing the temperature value with a comparison temperature value, the comparison temperature value obtained by a method other than obtaining the temperature value of the vibration member based on the vibration amplitude.

12. The method according to claim 9, wherein the method comprises amplifying at least one of the vibration amplitude and vibration frequency by an amplifying circuit.

13. The method according to claim 12, wherein the vibration amplitude is obtained prior to a capping and/or filtering operation by the amplifying circuit.

14. The method according to claim 9, wherein the vibration member is formed of at least one metal and/or at least one metal alloy.

15. The method according to claim 14, wherein the at least one metal and/or metal alloy comprises an alloy comprising at least one of Ni, Fe, Cr, Al and Ti.

16. The method according to claim 9, wherein the vibration member is hollow and/or cylindrical.

17. A non-transitory computer readable medium containing instructions, the instructions when executed, cause at least one processor to perform a process to determine a temperature corrected pressure of a medium in a pressure transducer, the process comprising:
   obtaining a first value related to a vibration frequency of the vibration of a vibration member, the vibration member configured to vibrate under an input of a pressure;
   obtaining a second value related to a vibration amplitude of the vibration of the vibration member; and
   using the first value and the second value to determine the temperature corrected pressure of the medium based on a predetermined relationship between the vibration frequency and the vibration amplitude.

18. The non-transitory computer readable medium according to claim 17, the process comprising calculating a temperature value of the vibration member based on the second value.

19. The non-transitory computer readable medium according to claim 18, the process comprising comparing the temperature value with a comparison temperature value, the comparison temperature value obtained by a method other than obtaining the temperature value of the vibration member based on the vibration amplitude.

20. The non-transitory computer readable medium according to claim 17, the process comprising:
- calculating a temperature value of the vibration member based on the second value; and
- comparing the temperature value with a comparison temperature value, the comparison temperature value obtained by a method other than obtaining the temperature value of the vibration member based on the vibration amplitude;
- wherein the comparing is performed at a greater time interval than the calculating.

* * * * *